(12) United States Patent
Vogel (10) Patent No.: US 6,367,832 B1
(45) Date of Patent: Apr. 9, 2002

(54) RETRACTABLE BIKE FENDER AND HOUSING ASSEMBLY

(76) Inventor: Tim Vogel, 2 New St., Glens Falls, NY (US) 12801

( * ) Notice: Subject to any disclaimer, the term of this patent is extended or adjusted under 35 U.S.C. 154(b) by 0 days.

(21) Appl. No.: 09/526,538

(22) Filed: Mar. 16, 2000

(51) Int. Cl.[7] .............................................. B62D 25/16
(52) U.S. Cl. ............................. 280/152.1; 280/152.3; 280/154; 280/160.1; 280/852
(58) Field of Search .......................... 280/152.1, 152.2, 280/152.3, 160.1, 154, 158.1, 160, 847, 849, 851, 852; 267/154; 293/105, 106, 118, 119

(56) References Cited

U.S. PATENT DOCUMENTS

| | | | | |
|---|---|---|---|---|
| 590,980 A | * | 10/1897 | Hall | 280/152.1 |
| 621,441 A | * | 3/1899 | Behrend | 280/152.1 |
| 635,614 A | * | 10/1899 | Thym | 280/152.1 |
| 741,997 A | * | 10/1903 | Beckwith | 280/152.1 |
| 3,571,792 A | * | 3/1971 | Sullivan | 340/134 |
| 4,097,639 A | * | 6/1978 | Millar | 428/215 |
| 4,243,241 A | * | 1/1981 | Davis | 280/158.1 |
| 5,121,935 A | | 6/1992 | Mathieu et al. | 280/152.3 |
| 5,562,296 A | | 10/1996 | Hall et al. | 280/152.3 |
| 5,700,022 A | * | 12/1997 | Finnson | 280/152.3 |
| 5,716,070 A | * | 2/1998 | Pearson | 280/852 |

* cited by examiner

Primary Examiner—J. J. Swann
Assistant Examiner—J. Allen Shriver, II
(74) Attorney, Agent, or Firm—Tom Hamill, Jr.

(57) ABSTRACT

A retractable bike fender and housing are provided. The bike fender resides in the housing while it is in its retracted position and depends from the housing when it is in its extended position. The bike fender includes an integral light at the distal end. The light is powered by a battery and may flash. Elements of the fender may be coated with a reflective material which may be illuminated by the integral light as well as other light sources. The housing is designed to mounted about the seat stem to provide a barrier against water and debris being flung against the rider by the rear wheel. The housing may also be mounted about the handle-bar stem to provide a barrier against water and debris being flung against the rider by the front wheel. The fender housing has an opening which permits the elongated fender to be extended and retracted from the housing. A hand operated drum within the housing may be rotated manually by grip hubs which extend through both sides of the housing. The fender is stored in the housing until use, and it is stored in a generally coiled fashion. A wiper is present proximal the opening of the housing which will wipe and remove any debris which may become attached to the underside of the bike fender. The housing may be mounted on a pivotable element, which will permit the angular orientation of the fender with respect to the wheel to be adjusted. Further, the housing may be removably affixed to the pivotable element, in order to permit quick removal and attachment.

4 Claims, 7 Drawing Sheets

RETRACTABLE BIKE FENDER AND HOUSING ASSEMBLY

BACKGROUND OF THE INVENTION

1. Field of the Invention

The present invention relates generally to bike fenders, and more particularly, to a retractable bike fender which resides in a housing, wherein the housing is adapted to be removably affixed to a seat or handlebar post.

2. Description of the Prior Art

Bicycle fenders which include a stored position and an extended position are known. U.S. Pat. No. 5,562,296 discloses a bicycle fender which is manually distorted to a compact storage position. The storage condition allows the fender to be carried on a bicycle in a non-operating, convenient condition or carried by the user. The fender may be applied when conditions merit and the fender may be easily removed.

U.S. Pat. No. 5,121,935 discloses a readily removable and collapsible bicycle fender. It includes a strip of resilient material such as spring steel which is fixed at one end to a connector, which in turn is fixed to a bicycle seat post. The fender has two states. In the first state the strip is self biased into a helical coil configuration. In the second state the strip is longitudinally straight and rigid and self biased into a bowed configuration between the side edges of the strip.

Thus, while the foregoing body of prior art indicates it to be well known to use readily removed and collapsible bicycle fenders, the provision of a bicycle fender which includes a light on its distal end is not contemplated. Nor does the prior art described above teach or suggest a bicycle fender where the top portion of the fender is coated with a light reflective material. The prior art does not describe a wiper integral with the housing for removing debris and water which may have accumulated on the bottom side of the fender. The prior art does not describe a housing where the fender resides when retracted and a housing from which the fender depends when it is elongated. The foregoing disadvantages are overcome by the unique structural features of the present invention as will be made apparent from the following description thereof. Other advantages of the present invention over the prior art also will be rendered evident.

SUMMARY OF THE INVENTION

To achieve the foregoing and other advantages, the present invention, briefly described, provides a retractable bike fender and housing. The bike fender resides in the housing while it is in its retracted position and depends from the housing when it is in its extended position. The bike fender includes an integral light at the distal end. The light is powered by a battery and may flash. Elements of the fender may be coated with a reflective material which may be illuminated by the integral light as well as other light sources. The housing is designed to mounted about the seat stem to provide a barrier against water and debris being flung against the rider by the rear wheel. The housing may also be mounted about the handlebar stem to provide a barrier against water and debris being flung against the rider by the front wheel. The fender housing has an opening which permits the elongated fender to be extended and retracted from the housing. A hand operated drum within the housing is rotated manually by use of grip hubs which extend through both sides of the housing. The fender is stored in the housing until use, and it is stored in a generally coiled fashion. A wiper is present proximal the opening of the housing which will wipe and remove any debris which may become attached to the underside of the bike fender. The housing may be mounted on a pivotable element, which will permit the angular orientation of the fender with respect to the wheel to be adjusted. Further, the housing may be removably affixed to the pivotable element, in order to permit quick removal and attachment.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is an object of the present invention to provide a bike fender and housing which includes a housing in which the fender may be manually retracted and partially withdrawn.

It is an object of the present invention to provide a bike fender and housing wherein the fender resides in the housing while it is in its retracted position and depends from the housing when it is in its extended position.

It is an object of the present invention to provide a bike fender and housing which includes a proximal end, a distal end, a top side, a bottom side, a right side and a left side.

It is an object of the present invention to provide a retractable bike fender which includes a light integral with the distal end.

It is an object of the present invention to provide a bike fender and housing wherein the proximal end resides within the housing when the bike fender is extended.

It is an object of the present invention to provide a bike fender and housing wherein the elements of the fender may be coated with a reflective material.

It is an object of the present invention to provide a bike fender and housing wherein the housing includes securing means to permit the housing to be affixed to a seat post or a handlebar post of a bicycle.

It is another object of the present invention to provide a bike fender and housing which may be easily and efficiently manufactured and marketed.

It is a further objective of the present invention to provide a bike fender and housing which is of durable and reliable construction.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a retractable bike fender and housing embodying the principles and concepts of the present invention will be described.

Figure 1:
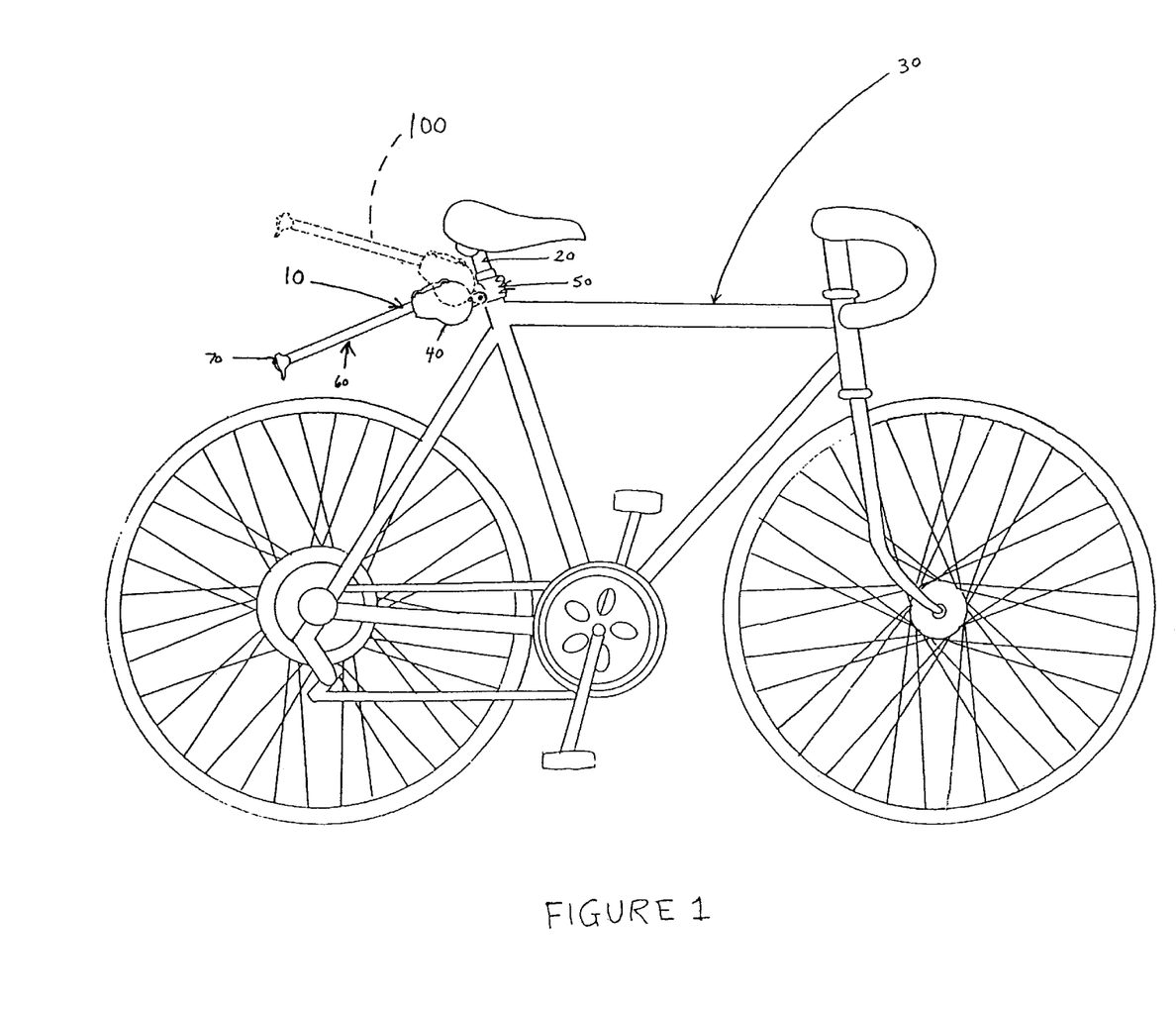
FIG. 1 is a view showing the bike fender mounted on the seat stem of a bicycle.

Turning initially to FIG. 1, the bike fender 10 is shown mounted on the seat stem 20 of a bicycle 30. Generally, the invention includes a housing 40 with a mounting element 50, and an extensible flexible fender element 60 with a light 70 affixed to the distal end of the fender 60. With the fender 60 and housing 40 mounted on the rear of the bicycle, any water and debris that would be thrown toward the rider by the rear wheel will be blocked.

The bike fender housing and assembly 100 is shown in dashed lines as to show another possible configuration of attachment to the seat stem 20. In this configuration, the housing is pivoted in an upward fashion.

Figure 2:
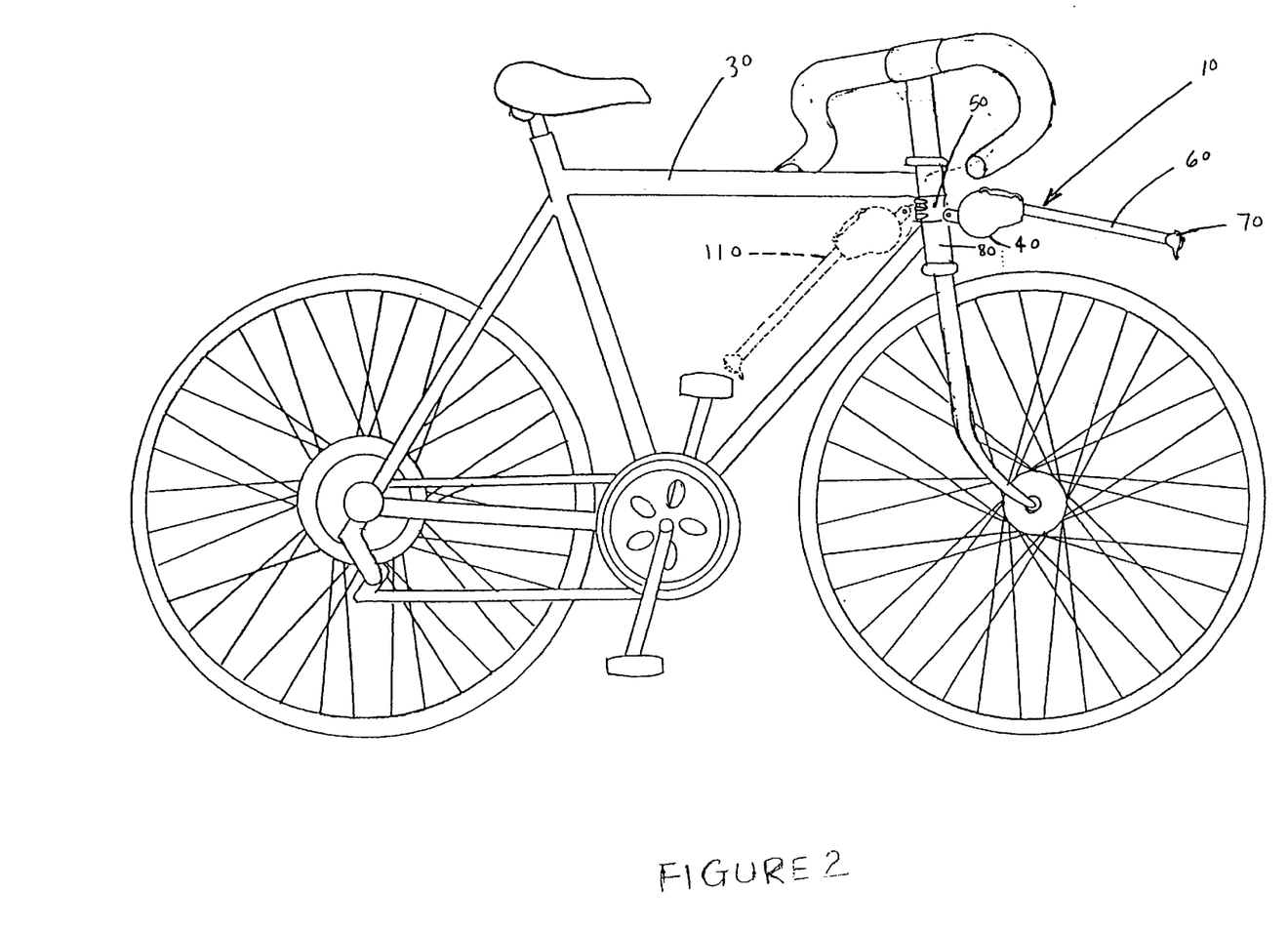
FIG. 2 is a view showing the bike fender mounted on the handlebar stem of a bicycle.

Referring now to FIG. 2, the bike fender 10 is shown mounted on the front handlebar stem 80 of the bicycle 30. Generally, the invention includes a housing 40 with a mounting element 50, and an extensible flexible fender element 60 with a light 70 affixed to the distal end of the fender 60. With the fender 60 and housing 40 mounted on the front of the bicycle, any water and debris that would be thrown toward the rider by the front wheel will be blocked.

The bike fender housing and assembly 110 is shown in dashed lines as to show another possible configuration of attachment to the handlebar stem 80. In this configuration, the housing is rearwardly mounted.

Figure 3:
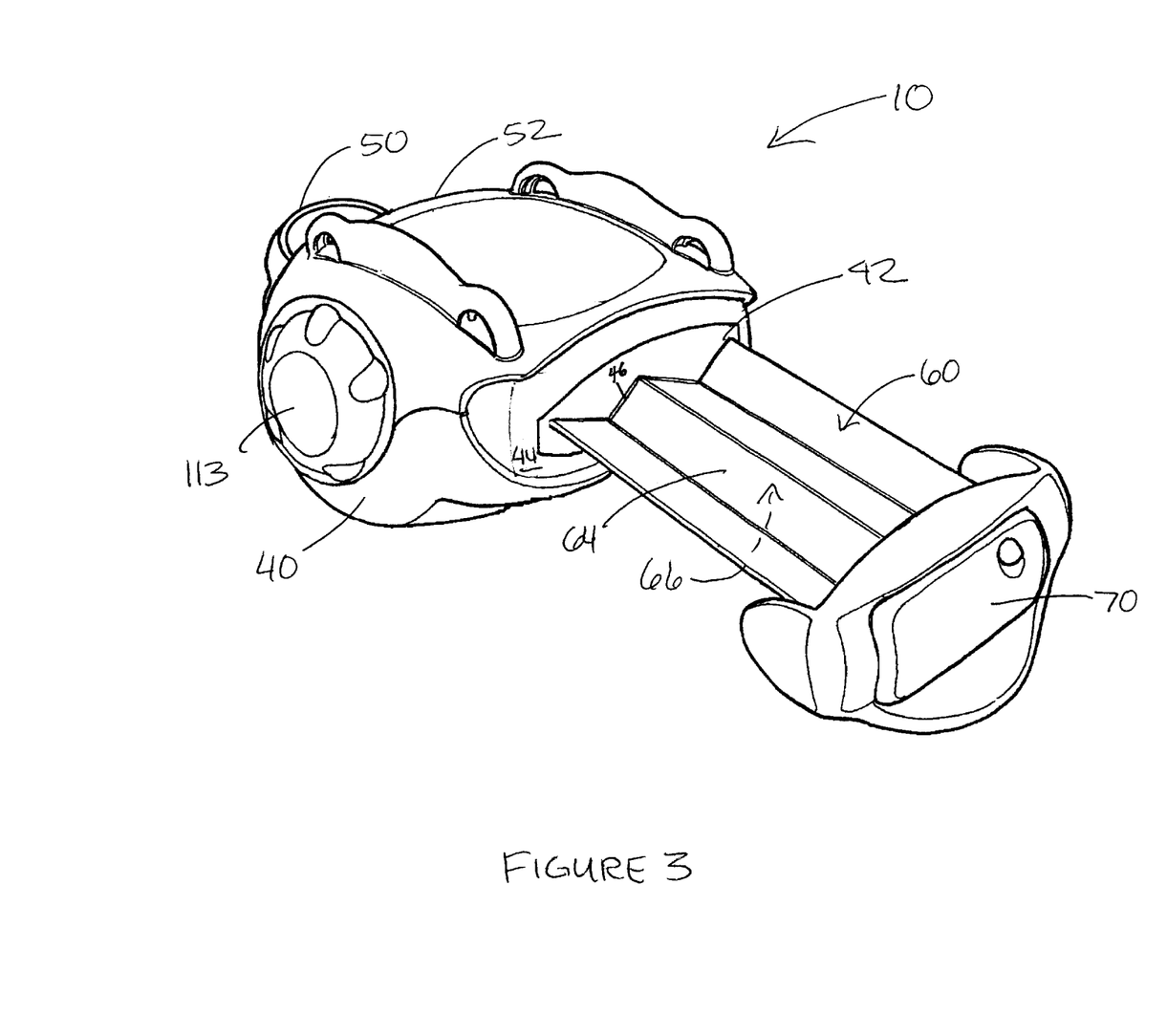
FIG. 3 is a view of the bike fender and housing with the fender element partially extended.

FIG. 3 shows a view of the retractable bike fender and housing assembly 10. Housing 40 has a face plate 42 with a first opening 46 on a first side 44. The fender 60 passes through the first opening 46 between a stored and an extended position. The fender 60 has a first position where it resides within the housing 40 and a second position, where it is resides outside the housing in a generally elongated fashion. The fender 60 is retained in the housing in a coiled configuration, and the fender 60 may be manually retracted into the housing 40 by rotation of drum 113. The drum 113 will rotate when the grip hubs 113A are manually rotated. In this manner the fender is wound upon drum 113 inside the housing 40. The fender 60 has a proximal end 82 and a distal end 84. The fender 60 has a top side 64 and a bottom side 66. The fender 60 top side 64 has a reflective coating 62 located along the length of the fender 60, ie: the reflective coating covers the top side 64 along the area intermediate the proximal and distal ends. This reflective coating 62 will further enhance the safety of the bike rider, by enhancing the visibility of the rider in the headlights of traffic. A reflective coating may also be located along the bottom side 66 of the fender as well. Further, reflective coatings may be placed on the housing 40. Any reflective or retro-reflective coating may be employed and several are well known in the art.

A light 70 is affixed to the distal end of the fender 60 and remains outside the housing 40. The light 70 may be gripped and pulled upon to extend the fender 60 from the housing 40 as well as to assist the return of the fender 60 to a housed condition. The light 70 is battery powered and may periodically flash or remain constantly on during darkness. Means such as a switch may be provided to actuate the light during the evening and deactivate the light during the daylight hours.

Housing 40 has an attachment means 50 located on a second side 52. The attachment means 50 may be of any type which would permit the housing 40 to be secured to a tubular member of a bicycle. The preferred attachment points are the seat stem and the handlebar post, however, as bicycle design evolves, there may be other preferred locations. Also, other attachment configurations may be provided to secure the housing 40 to non-cylindrical elements of a bicycle, as many new designs incorporate teardrop, elliptical, and elongated rectangular frame members.

The housing 40 may pivot up and down within about a 60 degree arc by the incorporation of an intermediate element 110 between the housing and the attachment means 50. The intermediate element will be more clearly shown and described in the description of FIGS. 5–7 below.

Figure 4:
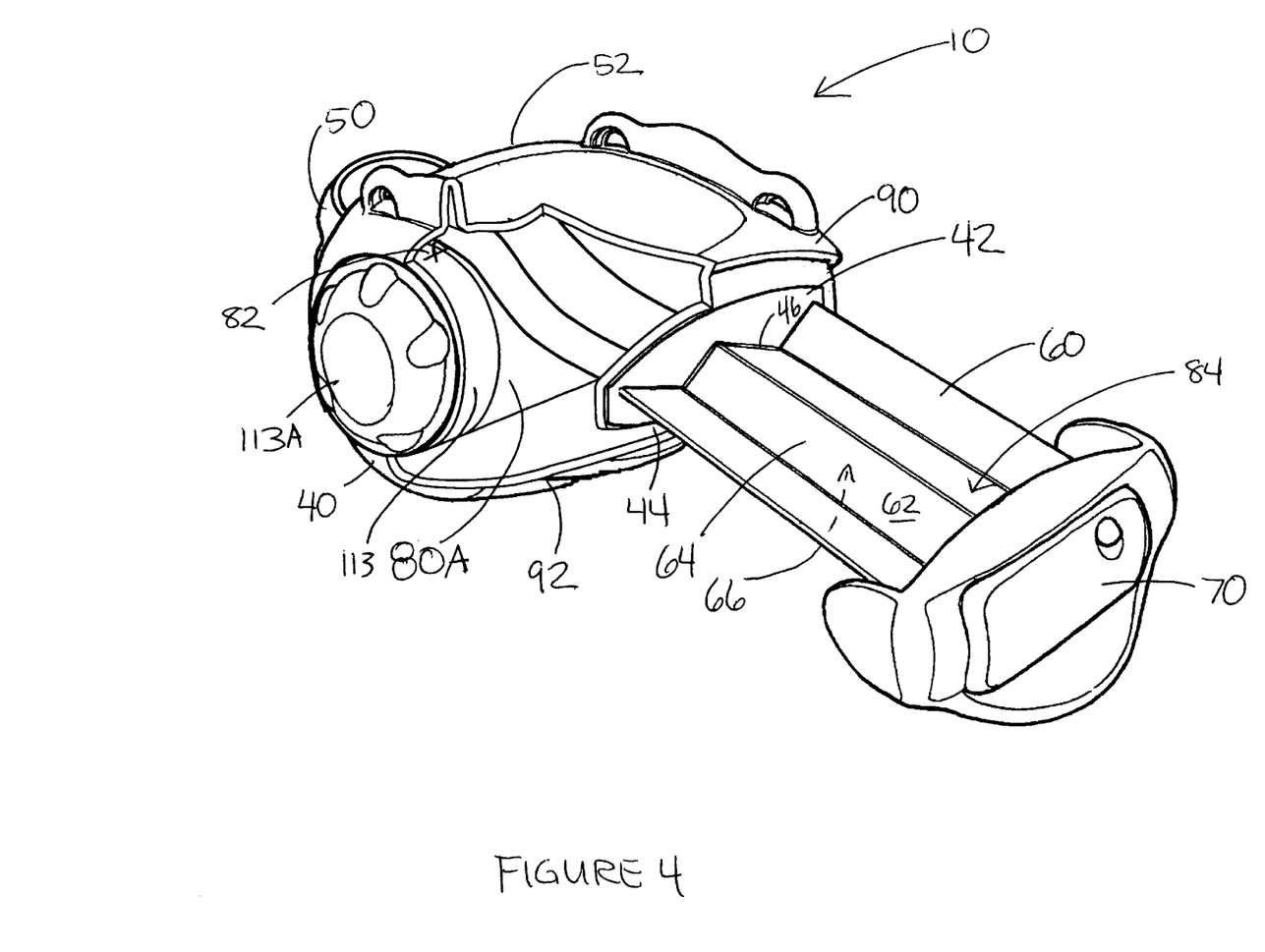
FIG. 4 is a view of the bike fender and housing with a cutaway through the housing showing the fender element residing therein.

FIG. 4 shows a cut away view into the interior of the housing 40. The first opening 46 is shown passing through the face plate 42. The first opening 46 acts as a wiper element which will coact with the top side 64 and the bottom side 66 of the fender 60 as it is reinserted back into the housing 40. The first opening 46 will remove and debris or water which may have accumulated on the bottom side 66 of the fender 60, keeping the stored fender generally clean and dry. The first opening 46 may have an arcuate, rectangular, W-shaped, M-shaped, or sawtooth shaped configuration. The first opening 46 has a W-shaped configuration as shown in FIGS. 3 and 4.

The fender 60 is shown in a coiled 80A fashion about drum 113 within the housing 40, with the proximal end 82 of the fender coiled about the drum 113 inside the housing 40 and the distal end 84 located near the light 70. The fender proximal end 82 may be affixed to the drum 113, so that when the grip hubs 113A are rotated the fender 60 extends or retracts from the housing 40. The housing 40 has a top side 90 and a bottom side 92. On both the interior right side and the interior left side, a series of spiraling grooves or tracks may be located to guide the fender 60 into the housed configuration within the housing 40.

Figure 5:
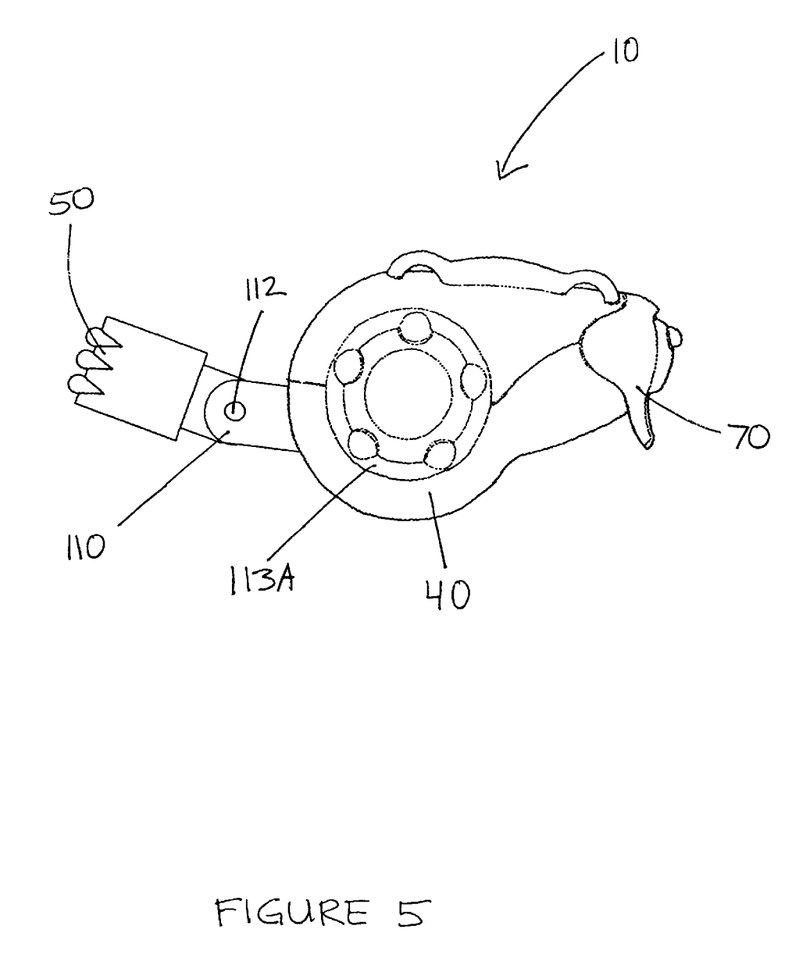
FIG. 5 is a side view of the bike fender with the fender fully stored in the housing.
Figure 6:
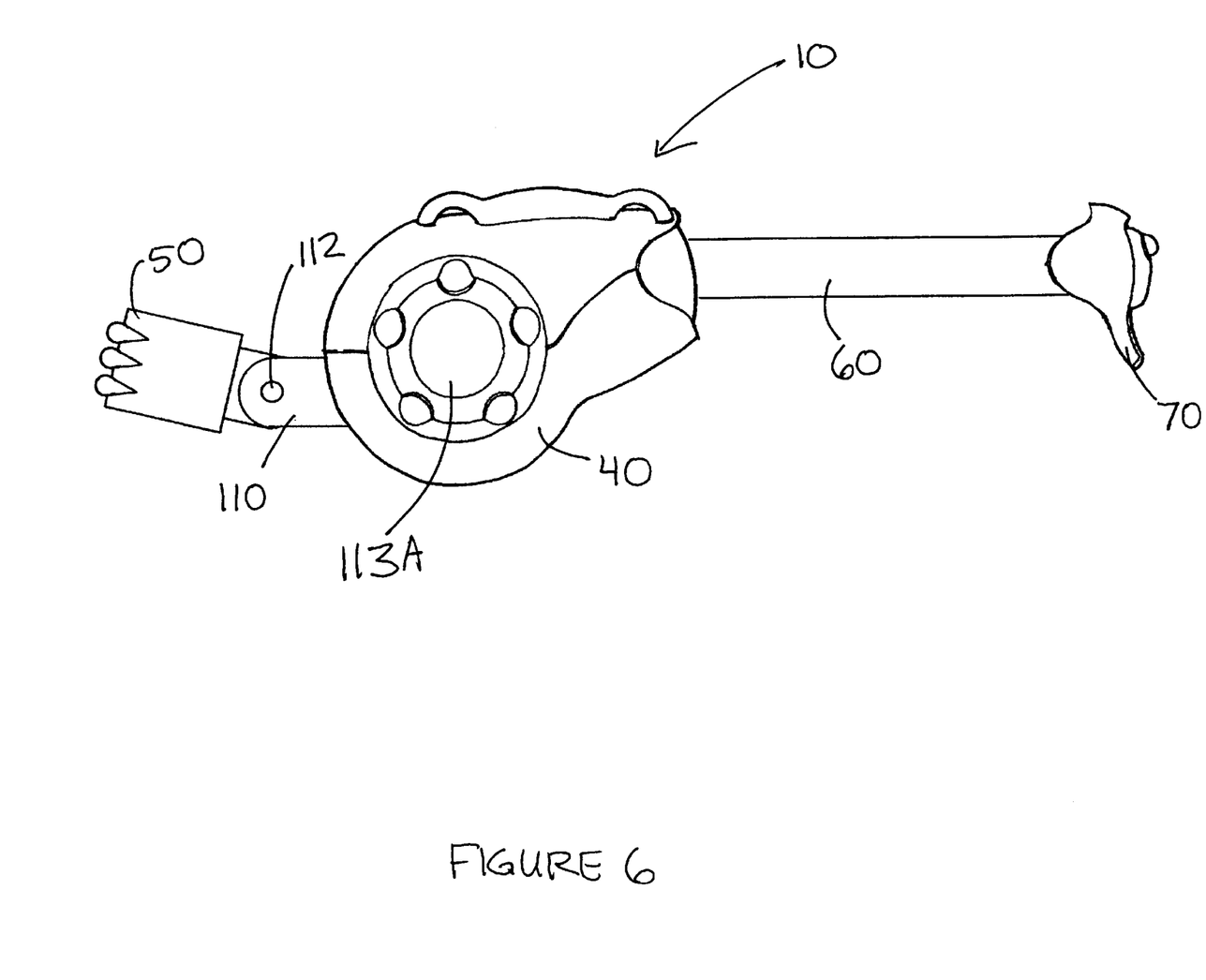
FIG. 6 is a side view of the bike fender with the fender partially extended from the housing.
Figure 7:
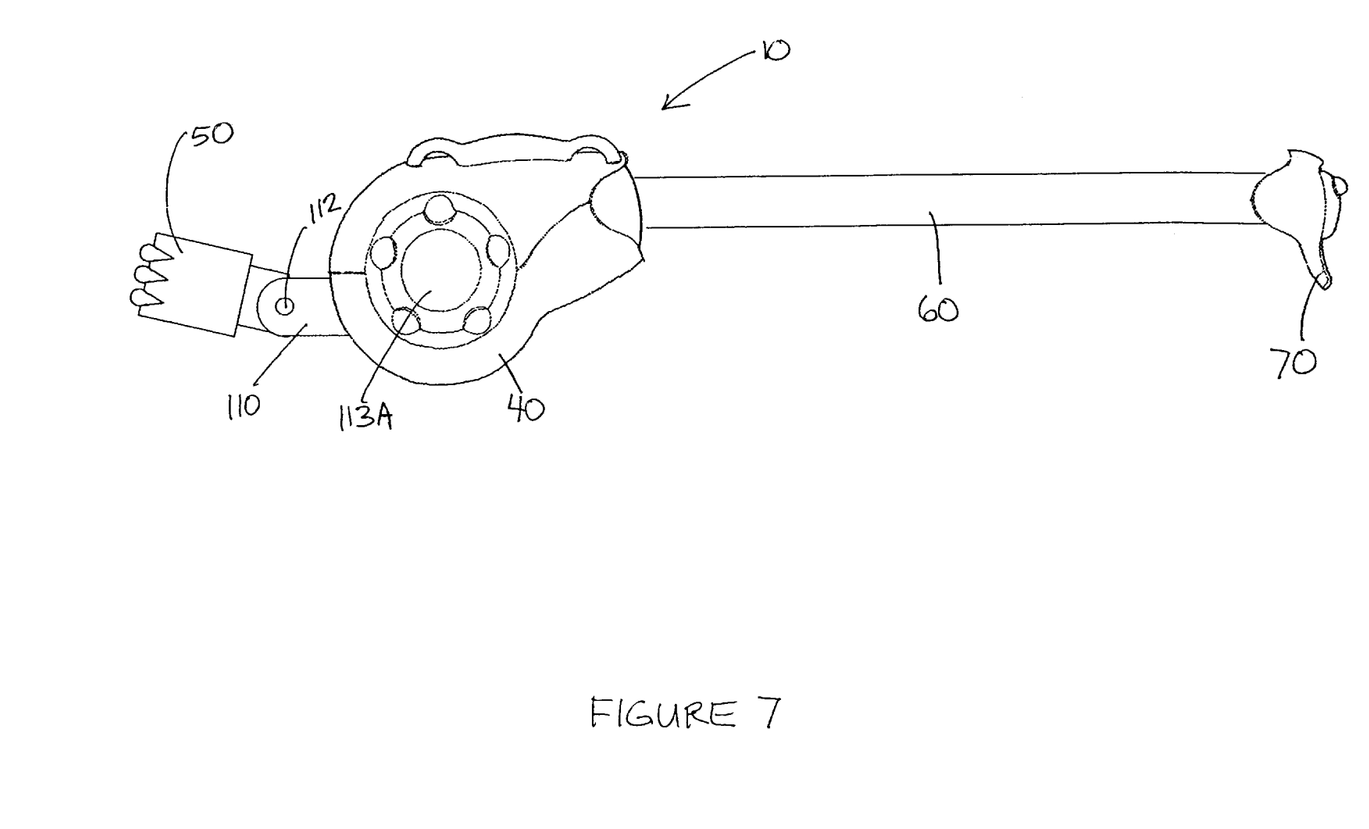
FIG. 7 is a side view of the bike fender with the fender fully extended from the housing.

Referring now specifically to FIGS. 5, 6 & 7, the bike fender and housing assembly 10 is shown in various states of extension. FIG. 5 shows the fender 60 fully enclosed in the housing 40. Note how the light 70 remains outside of the housing and may be able to be activated during nocturnal riding without extending the fender. FIG. 6 shows the fender 60 partially extended. The fender 60 will be manufactured of a material which although is flexible, will be able to maintain rigidity when extended. The material may include, but is not limited to, kydex. FIG. 7 shows the fender 60 fully extended.

Intermediate element 110 is located in between the attachment means 50 and the housing 40. A cylindrical element 112 permits the housing to pivot in a wide angular range to permit the fender to be adjusted to a position where it would best protect the rider from getting splashed with water and road debris.

It is apparent from the above that the present invention accomplishes all of the objectives set forth by providing a new and improved bike fender and housing assembly wherein the fender may be extended and retracted into the housing, as well as such an assembly including a plurality of visibility enhancing safety features including lights and reflective coatings.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A bicycle fender and housing assembly comprising:

a pivotable housing having a rear side, a front side, a right side, and a left side, attachment means located on said rear side of said housing, a first opening through said front side of said housing, said opening further having said bicycle fender passing there through, said bicycle fender having a proximal end and a distal end, a top side and a bottom side, a second opening passing through said right side and a third opening passing through said left side, said second opening and said third opening receiving a drum there through, said proximal end of said bicycle fender affixed to said drum, said drum further having a right side element and a left side element, said right side element and said left side element residing outside the housing and include gripping portions thereon, a light, said light affixed to said distal end, wherein wherein said sole attachment means is affixed to a tube member of the bicycle, and said bicycle fender is extended from said housing by gripping and pulling on said distal end away from said housing, causing said bicycle fender to unwind from said drum until said fender reaches its fully extended position and said fender is returned to said housing by rotating said gripping portions causing said bicycle fender to wind about said drum until it reaches its fully housed position.

2. A bicycle fender and housing assembly as claimed in claim 1 wherein said fender includes a reflective coating.

3. A bicycle fender and housing assembly as claimed in claim 1 wherein said fender includes a retro-reflective coating.

4. A bicycle fender and housing assembly as claimed in claim 1 wherein said first opening has said shape selected from the group consisting of an arcuate shape, a rectangular shape, a w-shape, a m-shape and a sawtooth shape.

\* \* \* \* \*